United States Patent
Park et al.

(10) Patent No.: US 8,925,111 B1
(45) Date of Patent: Dec. 30, 2014

(54) SCANNING PROBE MICROSCOPE AND METHOD OF OPERATING THE SAME

(71) Applicant: Samsung Electronics Co., Ltd., Suwon-Si, Gyeonggi-Do (KR)

(72) Inventors: Wan-Sung Park, Seoul (KR); Sung-Ha Kim, Gyeonggi-do (KR); Young-Hwan Kim, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 14/140,104

(22) Filed: Dec. 24, 2013

(30) Foreign Application Priority Data

Jun. 20, 2013 (KR) .................. 10-2013-0071156

(51) Int. Cl.
  *G01Q 10/00* (2010.01)
  *G01Q 20/04* (2010.01)
  *G01Q 30/20* (2010.01)
  *G01B 11/30* (2006.01)
  *G01Q 70/02* (2010.01)

(52) U.S. Cl.
  CPC ..................................... *G01Q 70/02* (2013.01)
  USPC .......... 850/1; 850/5; 850/29; 850/40; 850/53; 73/105

(58) Field of Classification Search
  CPC ....... G01Q 70/06; G01Q 60/54; B01L 3/5025
  USPC ............................ 850/1, 5, 29, 40, 53; 73/105
  See application file for complete search history.

(56) References Cited

U.S. PATENT DOCUMENTS

| | | | |
|---|---|---|---|
| 5,705,814 A | 1/1998 | Young et al. | |
| 6,093,930 A | 7/2000 | Boyette, Jr. et al. | |
| 6,201,227 B1 | 3/2001 | Tomita | |
| 6,668,628 B2 * | 12/2003 | Hantschel et al. | 73/105 |
| 7,709,791 B2 | 5/2010 | Jo et al. | |
| 7,891,016 B2 * | 2/2011 | Lee et al. | 850/6 |
| 7,958,566 B2 | 6/2011 | Lee et al. | |
| 8,024,816 B2 * | 9/2011 | Iyoki et al. | 850/1 |
| 8,166,567 B2 | 4/2012 | Phan et al. | |
| 8,302,456 B2 * | 11/2012 | Proksch | 73/1.89 |
| 8,443,459 B2 | 5/2013 | Phan et al. | |
| 2007/0180889 A1 | 8/2007 | Murayama et al. | |
| 2010/0122385 A1 | 5/2010 | Hu et al. | |
| 2012/0131702 A1 | 5/2012 | Shi et al. | |
| 2013/0061356 A1 | 3/2013 | Proksch | |

FOREIGN PATENT DOCUMENTS

| | | |
|---|---|---|
| JP | 2000171472 | 6/2000 |
| JP | 2006072081 | 3/2006 |
| JP | 2006125910 | 5/2006 |
| JP | 2007271358 | 10/2007 |
| JP | 2011230973 | 11/2011 |
| KR | 101998081247 | 11/1998 |
| KR | 1020050021853 | 3/2005 |
| KR | 1020080074436 | 8/2008 |

(Continued)

*Primary Examiner* — Nikita Wells

(74) *Attorney, Agent, or Firm* — F. Chau & Associates, LLC

(57) ABSTRACT

Provided are a scanning probe microscope and a method of operating the same. The scanning probe microscope includes a chuck configured to fix an object. A stacker is configured to load one or more cantilevers onto a head module. A stacker lifting element is configured to move the stacker in an up and down direction.

19 Claims, 15 Drawing Sheets

(56) References Cited

FOREIGN PATENT DOCUMENTS

| KR | 1020080104954 | 12/2008 |
| KR | 1020080110229 | 12/2008 |
| KR | 1020090014339 | 2/2009 |
| KR | 1020100019415 | 2/2010 |
| KR | 1020110086730 | 7/2011 |
| KR | 1020110111581 | 10/2011 |
| WO | WO2011126232 | 10/2011 |

* cited by examiner

SCANNING PROBE MICROSCOPE AND METHOD OF OPERATING THE SAME

CROSS-REFERENCE TO RELATED APPLICATION

This application claims priority under 35 U.S.C. §119 to Korean Patent Application No. 10-2013-0071156 filed on Jun. 20, 2013, the disclosure of which is incorporated by reference herein in its entirety.

TECHNICAL FIELD

Exemplary embodiments of the present inventive concept relate to a scanning probe microscope, and more particularly to a scanning probe microscope with a cantilever and a method of operating the same.

DISCUSSION OF RELATED ART

A scanning probe microscope is an instrument capable of inspecting a surface profile of an object. The scanning probe microscope may employ a cantilever including a tip. With regard to the scanning probe microscope, studies have been conducted for replacement of the cantilever without a contact occurring between a chuck and a head module.

SUMMARY

Exemplary embodiments of the present inventive concept provide a scanning probe microscope configured to replace a cantilever. The cantilever is fixed to a head module. The cantilever is replaced with another cantilever without a contact occurring between a chuck and the head module. Exemplary embodiments of the present inventive concept provide a method of operating the scanning probe microscope.

Exemplary embodiments of the present inventive concept provide a scanning probe microscope configured to replace a cantilever. The cantilever is fixed to a head module. The cantilever is replaced with a cantilever loaded on a stacker without elevating a chuck which supports an object. Exemplary embodiments of the present inventive concept provide a method of operating the microscope.

In accordance with exemplary embodiments of the present inventive concept, a scanning probe microscope includes a chuck configured to fix an object. A stacker is configured to load one or more cantilevers onto a head module. A stacker lifting element configured to move the stacker in an up/down direction.

In accordance with an exemplary embodiment of the present inventive concept, the stacker lifting element may include a lifting block configured to support the stacker. A lifting body may be disposed under the lifting block. The lifting body may include a first lift driving axis configured to move the lifting block in the up/down direction.

In accordance with an exemplary embodiment of the present inventive concept, the lifting body further may include a second lift driving axis configured to move the lifting block in the up/down direction. The second lift driving axis may be parallel to the first lift driving axis.

In accordance with an exemplary embodiment of the present inventive concept, the lifting block may include a guide region extending along a first side of the lifting body.

In accordance with an exemplary embodiment of the present inventive concept, a vertical dimension of the guide region of the lifting block may be larger than a vertical dimension of the first lift driving axis of the lifting body.

In accordance with an exemplary embodiment of the present inventive concept, the stacker lifting element may further include a linear moving block configured to move along the first side of the lifting body in the up/down direction. The linear moving block may be coupled to the guide region of the lifting block.

In accordance with an exemplary embodiment of the present inventive concept, the chuck may further include a chuck holding part configured to support the object A chuck body may be disposed under the chuck holding part. The chuck may include a lift fixing block configured to fix the lifting body to the chuck body.

In accordance with an exemplary embodiment of the present inventive concept, the lift fixing block may be disposed opposite to a second side of the lifting body. A horizontal dimension of the second side of the lifting body may be larger than a horizontal dimension of the first side of the lifting body.

In accordance with an exemplary embodiment of the present inventive concept, when the stacker is lowered by the stacker lifting element, a level of the top surface of the stacker may be lower than a level of the top surface of the chuck. When the stacker is raised by the stacker lifting element, the level of the top surface of the stacker may be higher than the level of the top surface of the chuck.

In accordance with an exemplary embodiment of the present inventive concept, a scanning probe microscope includes a chuck holding part configured to support an object. A chuck body is disposed under the chuck holding part. A chuck driving element is disposed under the chuck body. A stacker is configured to load one or more cantilevers. The stacker is horizontally spaced apart from the chuck holding part. A stacker lifting element is disposed under the stacker. The stacker lifting element includes a lift driving axis configured to move the stacker in an up and down direction. A lift fixing block is configured to couple the stacker lifting element to the chuck body.

In accordance with an exemplary embodiment of the present inventive concept, the lift fixing block may include a horizontal region extending between the stacker and the stacker lifting element. The horizontal region may include a driving hold configured to pass through the lift driving axis and a first guide hole spaced apart from the driving hole.

In accordance with an exemplary embodiment of the present inventive concept, the stacker may be coupled to the lift driving axis. The stacker may include a first guide pin inserted into the first guide hole.

In accordance with an exemplary embodiment of the present inventive concept, when the stacker is raised by the stacker lifting element, a vertical dimension between the bottom surface of the stacker and the top surface of the horizontal region may be shorter than a vertical dimension of the first guide pin.

In accordance with an exemplary embodiment of the present inventive concept, a vertical dimension of the first guide pin may be shorter than a vertical dimension of the horizontal region.

In accordance with an exemplary embodiment of the present inventive concept, the horizontal region of the lift fixing block may include a second guide hole spaced apart from the first guide hole. The stacker may include a second guide pin disposed in the second guide hole. The driving hole may be disposed between the first guide hole and the second guide hole.

BRIEF DESCRIPTION OF THE DRAWINGS

The above and other features of the inventive concept will become more apparent by describing in detail exemplary embodiments thereof, with reference to the accompanying drawings in which.

DETAILED DESCRIPTION OF THE EMBODIMENTS

Figure 1:
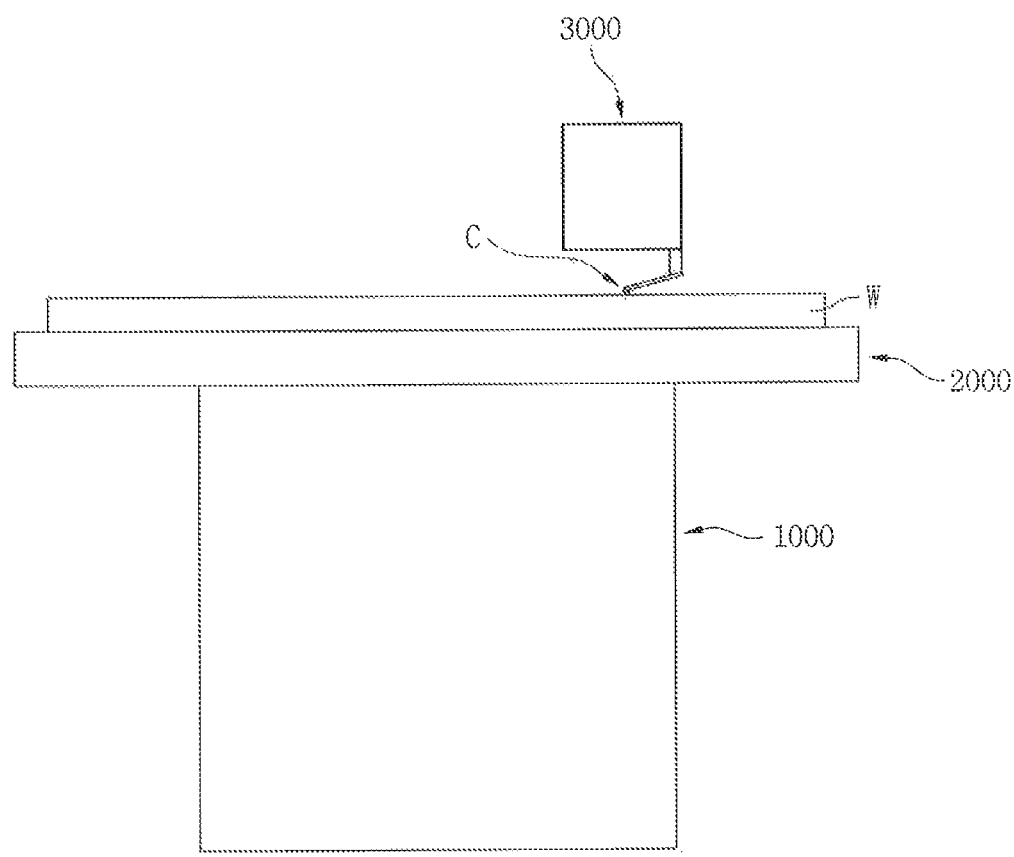
FIG. 1 is a schematic view of a scanning probe microscope in accordance with exemplary embodiments of the present inventive concept.

Exemplary embodiments of the present inventive concept will now be further described with reference to the accompanying drawings in which exemplary embodiments are shown. The present inventive concept may, however, be embodied in different forms and should not be construed as limited to the exemplary embodiments set forth herein. In the drawings, the sizes and relative sizes of layers and regions may be exaggerated for clarity. Like numerals may refer to like elements throughout.

It will be understood that, although the terms first, second, third, etc. may be used herein to describe various elements, components, regions, layers and/or sections, these elements, components, regions, layers and/or sections should not be limited by these terms. A first element, component, region, layer or section discussed below may be termed a second element, component, region, layer or section without departing from the present inventive concept.

The regions illustrated in the figures are schematic in nature and their shapes are not intended to illustrate the actual shape of a region of a device and are not intended to limit the scope of the present inventive concept.

FIG. 1 is a schematic view of a scanning probe microscope in accordance with exemplary embodiments of the present inventive concept.

Referring to FIG. 1, a scanning probe microscope according to exemplary embodiments of the present inventive concept may include a chuck driving element 1000, a chuck assembly 2000 and a head module 3000. The chuck assembly 2000 may be disposed on the chuck driving element 1000. The head module 3000 may be disposed on the chuck assembly 2000. An object W may be disposed between the chuck assembly 2000 and the head module 3000. The object W may be positioned to be inspected. For example, the object W may include a wafer in which a pattern or a layer is formed. The head module 3000 may measure a surface profile of the object W using a cantilever C.

The chuck driving element 1000 may support the chuck assembly 2000. The chuck driving element 1000 may actuate the chuck assembly 2000. For example, the chuck driving element 1000 may move the chuck assembly 2000 in an up/down direction. The chuck assembly 2000 may be rotated by the chuck driving element 1000.

The chuck assembly 2000 may support the object W. The chuck assembly 2000 may fix the object W. When the head module 3000 measures a surface profile of the object W, the object W may be fixed on a top surface of the chuck assembly 2000.

The chuck assembly 2000 may be disposed between the chuck driving element 1000 and the head module 3000. A bottom surface of the chuck assembly 2000 may be in direct contact with the chuck driving element 1000. The top surface of the chuck assembly 2000 may be spaced apart from the head module 3000. The object W may be spaced apart from the head module 3000.

Figure 2A:
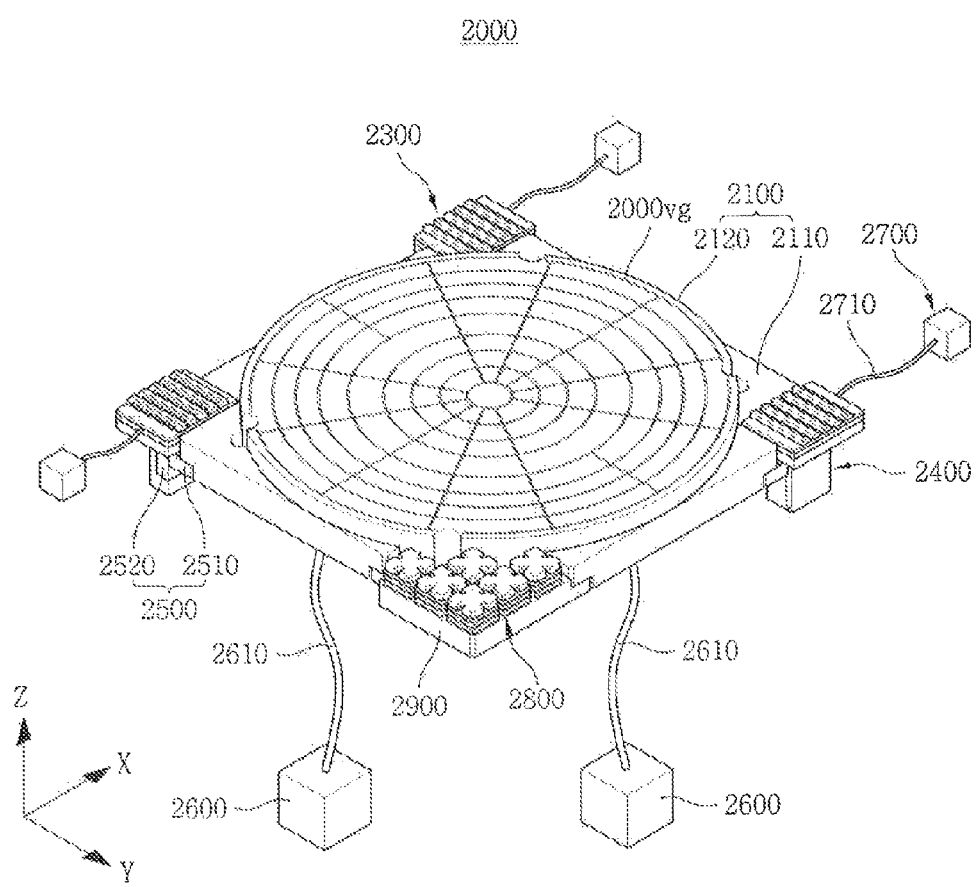
FIGS. 2A and 2B are perspective views illustrating a chuck assembly of a scanning probe microscope in accordance with an exemplary embodiment of the present inventive concept.
Figure 2B:
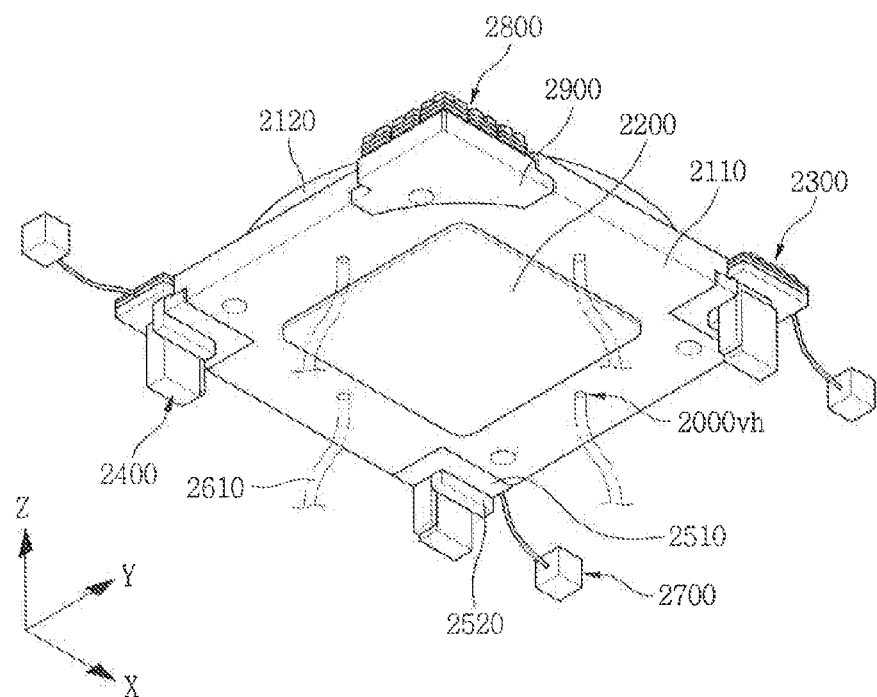
Figure 3:
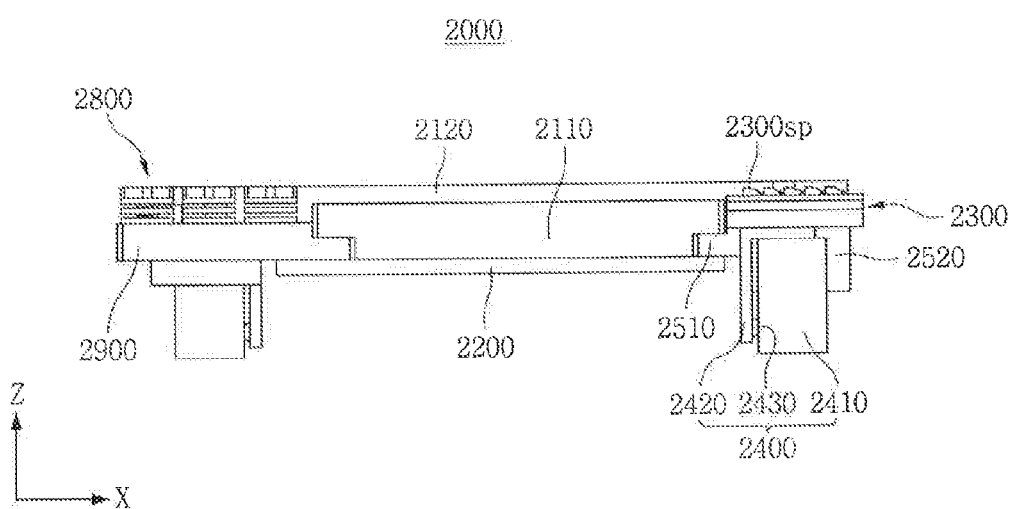
FIG. 3 is a side view illustrating a chuck assembly of a scanning probe microscope in accordance with an exemplary embodiment of the present inventive concept.

FIGS. 2A and 2B are perspective views illustrating the chuck assembly 2000 of a scanning probe microscope in accordance with an exemplary embodiment of the present inventive concept. FIG. 3 is a side view illustrating a chuck assembly 2000 of a scanning probe microscope in accordance with an exemplary embodiment of the present inventive concept.

Referring to FIGS. 1, 2A, 2B and 3, the chuck assembly 2000 of the scanning probe microscope according to exemplary embodiments of the present inventive concept may include a chuck 2100, a stacker 2300, a stacker lifting element 2400, a lift fixing block 2500, a chuck vacuum pump 2600, and a stacker vacuum pump 2700.

The chuck 2100 may fix the object W. The object W may be held by the chuck 2100. The chuck 2100 may include a chuck body 2110 and a chuck holding part 2120.

The chuck body 2110 may support the chuck holding part 2120. The chuck body 2110 may be disposed on the chuck driving element 1000. The chuck body 2110 may be supported by the chuck driving element 1000. The bottom surface of the chuck body 2110 may in direct contact with the chuck driving element 1000.

The chuck body 2110 may be insulated from the chuck driving element 1000. For example, the chuck assembly 2000 may include an insulation plate 2200. The insulation plate 2200 may be disposed between the chuck driving element 1000 and the chuck body 2110. The insulation plate 2200 may be attached to the bottom surface of the chuck body 2110. A size of the insulation plate 2200 may be a same size as a size of the top surface of the chuck driving element 1000.

The chuck holding part 2120 may support the object W. The object W may be fixed to the top surface of the chuck holding part 2120. The object W may be indirect contact with the top surface of the chuck holding part 2120.

The chuck holding part 2120 may be located on the chuck body 2110. A size of chuck holding part 2120 may be smaller than a size of the chuck body 2110. For example, the chuck holding part 2120 may be a circle shape, and may fit within the chuck body 2110. The area of the chuck holding part 2120 may be a same area as the inscribed circle area of the chuck body 2110. The chuck body 2110 may be a square shape.

The chuck 2100 may include a chuck vacuum hole 2000vh and a chuck vacuum groove 2000vg.

The chuck vacuum hole 2000vh may penetrate the chuck 2100 in an up/down direction. The chuck vacuum hole 2000vh may be connected with a chuck vacuum line 2610 of the chuck vacuum pump 2600.

The chuck vacuum groove 2000vg may be disposed on the top surface of the chuck holding part 2120. The chuck vacuum groove 2000vg may be formed in a desired pattern at the top surface of the chuck holding part 2120. For example, the chuck vacuum groove 2000vg may be a radial shape at the top surface of the chuck holding part 2120.

The chuck vacuum groove 2000vg may be connected with the chuck vacuum hole 2000vh. The chuck vacuum hole 2000vh may be connected with the chuck vacuum line 2610 by the chuck vacuum groove 2000vg. The object W may be fixed to the top surface of the chuck holding part 2120 by the chuck vacuum pump 2600.

The stacker 2300 may load cantilevers onto the chuck holding part 2120. The stacker 2300 may include cantilever loading spots 2300sp. The cantilever loading spots 2300sp may be disposed on the top surface of the stacker 2300.

The stacker 2300 may include a stacker vacuum hole 2300vh. The stacker vacuum hole 2300vh of the stacker 2300 may be connected with the stacker vacuum line 2710 of the stacker vacuum pump 2700. The cantilever loading spots 2300sp may be connected with the stacker vacuum pump 2700 by the stacker vacuum hole 2300vh. Each of the cantilevers C may be fixed to corresponding cantilever loading spot 2300sp by the stacker vacuum pump 2700.

The stacker 2300 may be spaced apart from the chuck 2100. For example, the stacker 2300 may be disposed on the side of the chuck body 2110. The stacker 2300 may be horizontally isolated from the chuck holding part 2120. For example, the stacker 2300 may be disposed at a corner of the chuck 2100.

The stacker lifting element 2400 may move the stacker 2300 in the up/down direction Z. The cantilevers loaded on the stacker 2300 may move along the up/down direction Z by the stacker lifting element 2400. When the stacker 2300 is lowered by the stacker lifting element 2400, the stacker 2300 may be supported by the stacker lifting element 2400.

The stacker lifting element 2400 may be disposed under the stacker 2300. The stacker lifting element 2400 may be disposed on a side of the chuck body 2110. The stacker lifting element 2400 may be spaced apart from the chuck 2100. A level of the top surface of the stacker lifting element 2400 may be lower than a level of the top surface of the chuck 2100. A level of the top surface of the stacker lifting element 2400 may be lower than a level of the top surface of the chuck body 2110. For example, the stacker lifting element 2400 may be positioned laterally with respect to the chuck body 2110 in the horizontal direction.

Figure 4A:
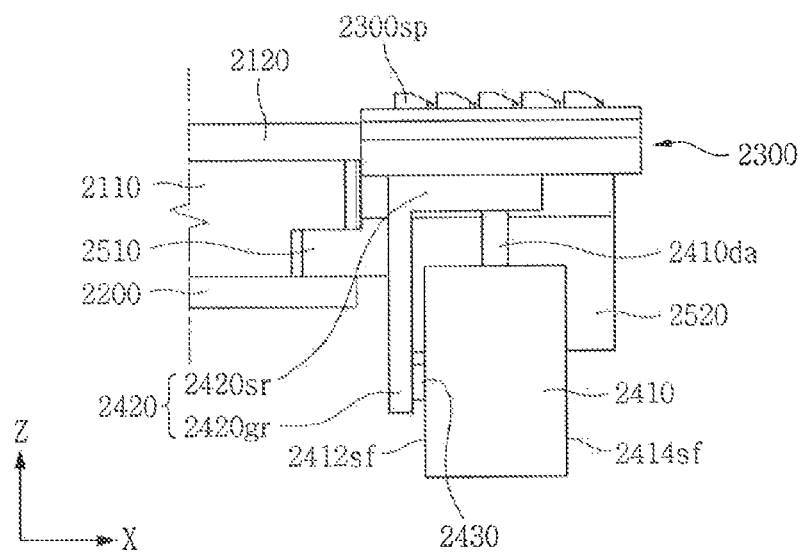
FIGS. 4A and 4B are side views illustrating a stacker lifting element of a scanning probe microscope in accordance with an exemplary embodiment of the present inventive concept.
Figure 4B:
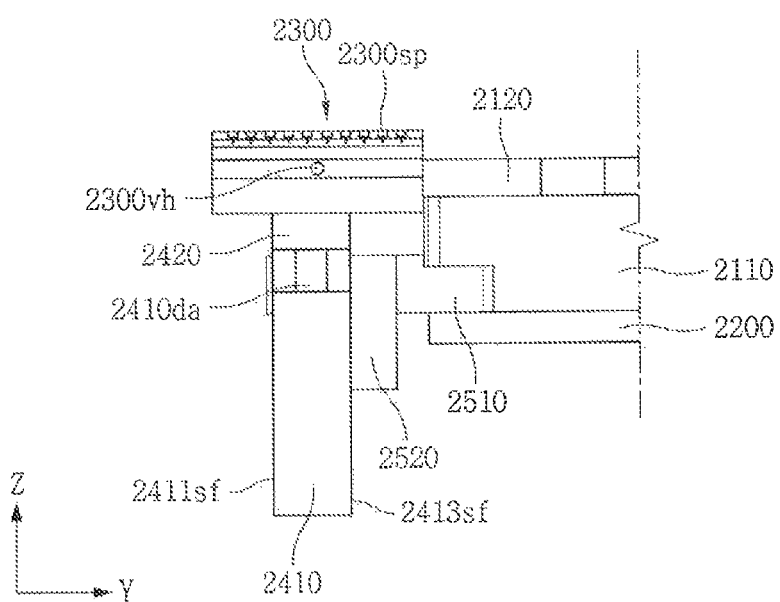

FIGS. 4A and 4B are side views illustrating a stacker lifting element of a scanning probe microscope in accordance with exemplary embodiments of the present inventive concept.

Referring to FIGS. 2A, 2B, 3, 4A and 4B, the stacker lifting element 2400 of the scanning probe microscope according to exemplary embodiments of the present inventive concept may include a lifting body 2410, a lifting block 2420 and a linear moving block 2430.

The lifting body 2410 may move the lifting block 2420 in the up/down direction Z. When the lifting block 2420 is lowered by the lifting body 2410, the lifting body 2410 may support the lifting block 2420.

The lifting body 2410 may be disposed on a side of the chuck 2100. The lifting body 2410 may be placed laterally with respect to the chuck 2100 in the horizontal direction. The lifting body 2410 may be isolated from the chuck body 2110 in the horizontal direction. A level of the top surface of the lifting body 2410 may be lower than a level of the bottom surface of the chuck holding part 2120.

The lifting body 2410 may include a first side 2411sf, a second side 2412sf, a third side 2413sf, and a fourth side 2414sf. The second side 2412sf of the lifting body 2410 may be perpendicular to the first side 2411sf of the lifting body 2410. The third side 2413sf of the lifting body 2410 may be perpendicular to the second body 2412sf of the lifting body 2410. The third side 2413sf of the lifting body 2410 may be opposite to the first side 2411sf of the lifting body 2410. The fourth side 2414sf of the lifting body 2410 may be perpendicular to the third body 2413sf of the lifting body 2410. The fourth side 2414sf of the lifting body 2410 may be opposite to the second side 2412sf of the lifting body 2410. The fourth side 2414sf of the lifting body 2410 may be perpendicular to the first side 2411sf of the lifting body 2410.

The first side 2411sf and the third side 2413sf of the lifting body 2410 may be extended along the first direction X. For example, the first side 2411sf and the third side 2413sf may be parallel to a plane formed in the first direction X and the up/down direction Z. The second side 2412sf and the fourth side 2414sf of the lifting body 2410 may be extended along the second direction Y. The second direction Y may be perpendicular to the plane formed in the first direction X and the up/down direction Z. For example, the second side 2412sf and the fourth side 2414sf may be parallel to a plane formed in the second direction Y and the up/down direction Z.

The first side 2411sf and the second side 2412sf of the lifting body 2410 may face a side of the chuck body 2100. A horizontal distance of the first side 2411sf of the lifting body 2410 may be smaller than a horizontal distance of the second side 2412sf of the lifting body 2410. A horizontal distance of the second side 2412sf along the second direction Y may be larger than a horizontal distance of the first side 2411sf along the first direction X.

The lifting body 2410 may include a lift driving axis 2410da. The lift driving axis 2410da may move along the up/down direction Z. The lifting block 2420 may be moved in the up/down direction Z away from the lifting body 2410 by the lift driving axis 2410da.

The lifting block 2420 may support the stacker 2300. The stacker 2300 may be disposed on the top surface of the lifting block 2420. The stacker 2300 may be moved together with the lifting block 2420 along the up/down direction Z by the lift driving axis 2410da of the lifting body 2410. The lifting block 2420 may include a supporting region 2420sr and a guide region 2420gr.

The supporting region 2420sr of the lifting block 2420 may be disposed on the bottom surface of the stacker 2300. The stacker 2300 may be supported by the supporting region 2420sr of the lifting block 2420. The top surface of the supporting region 2420sr of the lifting block 2420 may be in direct contact with the bottom surface of the stacker 2300. The supporting region 2420sr of the lifting block 2420 may be parallel to the bottom surface of the stacker 2300. The bottom surface of the supporting region 2420sr of the lifting block 2420 may be coupled to the lift driving axis 2410da of the lifting body 2410.

The guide region 2420gr of the lifting block 2420 may be extended along a side of the stacker 2300. For example, the guide region 2420gr of the lifting block 2420 may be extended along the second side 2412sf of the stacker 2300. The second side 2412sf of the stacker 2300 may face the guide region 2420gr of the lifting block 2420. The guide region 2420gr of the lifting block 2420 may be parallel to the second side 2412sf of the stacker 2300. The guide region 2420gr of the lifting block 2420 may be spaced apart from the second side 2412sf of the stacker 2300.

The linear moving block 2430 may be disposed on a side of the lifting body 2410. For example, the linear moving block 2430 may be disposed on the second side 2412sf of the lifting body 2410. The linear moving block 2430 may be disposed between the second side 2412sf of the lifting body 2410 and the guide region 2420gr of the lifting block 2420.

The linear moving block 2430 may be coupled to the guide region 2420gr of the lifting block 2420. The linear moving block 2430 may be moved along the up/down direction by the guide region 2420gr of the lifting block 2420. The linear moving block 2430 may be moved along the second side 2412sf of the lifting body 2410 by the lift driving axis 2410da in the up/down direction.

In the scanning probe microscope according to exemplary embodiments of the present inventive concept, the lifting block 2420 of the stacker lifting element 2400 may include the guide region 2420gr extending along the second side 2412sf of the lifting body 2410. The guide region 2420gr of the lifting block 2420 may be coupled to the linear moving block 2430 disposed on the second side 2412sf of the lifting body 2410. The linear moving block 2430 may move together with lifting block 2420 along the second side 2412sf of the lifting body 2410 in the up/down direction. In the scanning probe microscope according to exemplary embodiments of the present inventive concept, the guide region 2420gr of the lifting block 2420 may prevent a rotation of the lifting block 2420. When the stacker 2300 is moved in the up/down direction by the stacker lifting element 2400, the scanning probe microscope according to exemplary embodiments of the present inventive concept may prevent a rotation of the stacker 2300. In the scanning probe microscope according to exemplary embodiments of the present inventive concept, when replacing a cantilever, cantilevers loaded on the stacker 2300 may be transferred toward an exact position.

The lift fixing block 2500 may fix the stacker lifting element 2400 to the chuck body 2100. The lift fixing block 2500 may include a first fixing block 2510 and a second fixing block 2520.

The first fixing block 2510 may be disposed between the chuck body 2110 and the lifting body 2410. The first fixing block 2510 may be disposed adjacent to the chuck body 2110. For example, the first fixing block 2510 may surround the second side 2412sf and the third side 2413sf of the lifting body 2410. The second side 2412sf and the third side 2413sf of the lifting body 2410 may face the first fixing block 2510. The first fixing block 2510 may be coupled to the chuck body 2100.

The second fixing block 2520 may face a side of the lifting body 2410. For example, the second fixing block 2520 may face one side which has a relatively wider horizontal distance among sides of the lifting body 2410. The second fixing block 2520 may face the third side 2413sf of the lifting body 2410. The second fixing block 2520 may be disposed between the first fixing block 2510 and the third side 2413sf of the lifting body 2410. The second fixing block 2520 may be combined with the third side 2413sf of the lifting body 2410. The second fixing block 2520 may be coupled to the first fixing block 2510 facing the third side 2413sf of the lifting body 2410.

In the scanning probe microscope according to exemplary embodiments of the present inventive concept, the third side 2413sf of the lifting body 2410 may be combined with the chuck body 2110 by the lift fixing block 2500. In the scanning probe microscope according to exemplary embodiments of the present inventive concept, the lifting body 2410 may be fixed to the chuck 2100.

When the stacker 2300 is lowered by the stacker lifting element 2400, a level of the top surface of the second fixing block 2520 may be a same level as a level of the top surface of the lifting block 2420. A level of the top surface of the second fixing block 2520 may be a same level with as a level of the top surface of the first fixing block 2510. When the stacker 2300 is lowered by the stacker lifting element 2400, the first fixing blocks 2510 and the second fixing block 2520 may support the stacker 2300. When the stacker 2300 is lowered by the stacker lifting element 2400, the bottom surface of the stacker 2300 may be in direct contact with the top surface of the first fixing block 2510 and the second fixing block 2520.

Referring to FIGS. 1, 2A, 2B and 3, the chuck 2000 of the scanning probe microscope according to exemplary embodiments of the present inventive concept may include a reference pad 2800 and a pad supporting block 2900.

The reference pad 2800 may provide a reference height. For example, a surface profile of the object W may be inspected with reference to a height of the reference pad 2800.

The reference pad 2800 may be spaced apart from the chuck 2100. The reference pad 2800 may be disposed on a side of the chuck holding part 2120. A level of the top surface of the reference pad 2800 may be a same level as a level of the top surface of the chuck 2100.

The pad supporting block 2900 may support the reference pad 2800. The pad supporting block 2900 may be disposed under the reference pad 2800. The pad supporting block 2900 may be disposed on a side of the chuck body 2100. The pad supporting block 2900 may be coupled to the chuck body 2100.

Figure 5:
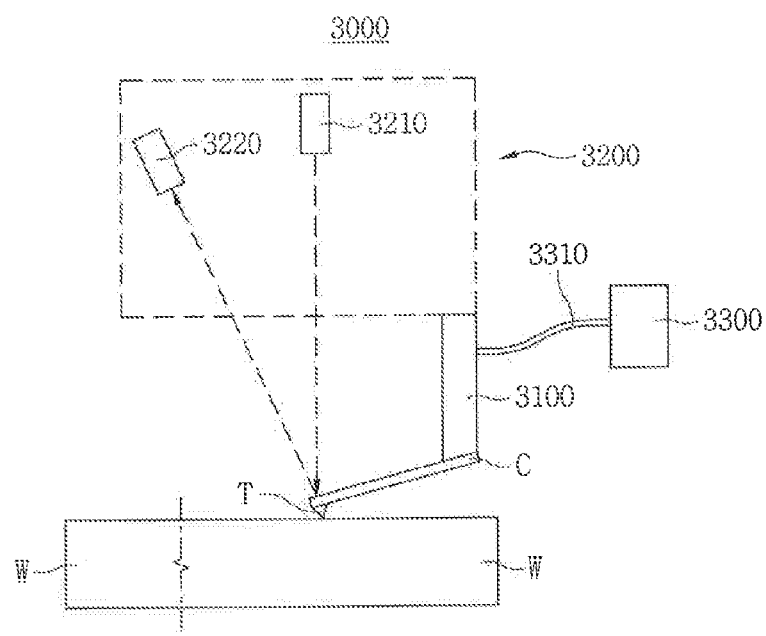
FIG. 5 is a schematic view illustrating a head module of a scanning probe microscope in accordance with an exemplary embodiment of the present inventive concept.

FIG. 5 is a schematic view illustrating a head module 3000 of a scanning probe microscope in accordance with exemplary embodiments of the present inventive concept.

Referring to FIG. 5, the head module 3000 of the scanning probe microscope according to exemplary embodiments of the present inventive concept may include a cantilever fixing element 3100, an optical assembly 3200 and a head vacuum pump 3300.

The cantilever fixing element 3100 may fix the cantilever C. The cantilever C may include a tip T. The tip T may be disposed near the surface of the object W. The tip T of the cantilever C may be spaced apart from the surface of the object W. The tip T of the cantilever C may move in the up/down direction along the surface profile of the object W.

The cantilever fixing element 3100 may drive the cantilever C. For example, the cantilever C may be moved in a circular pattern in the first direction X by the cantilever fixing element 3100.

The cantilever fixing element 3100 may be connected to the head vacuum pump 3300. When the surface profile of the object W is measured, the cantilever C may be fixed on the bottom surface of the cantilever fixing element 3100 by the head vacuum pump 3300. The head vacuum pump 3300 may be connected to the cantilever fixing element 3100 by a head vacuum pump line 3310.

The optical assembly 3200 may measure a position of the cantilever C. The optical assembly 3200 may measure a positional variation of the tip T of the cantilever C. The surface profile of the object W may be measured according to an amount of positional variation of the tip T of the cantilever C which may be measured by the optical assembly 3200. The optical assembly 3200 may include a light source element 3210 and a light detection element 3220.

The light source element 3210 may radiate light to the tip T of the cantilever C. The light detection element 3220 may detect a beam reflected from the cantilever C. The light detection element 3220 may measure a wavelength, intensity or a position of light reflected from the cantilever C, for example.

The head vacuum pump 3300 may fix a position of the cantilever C.

Figure 6:
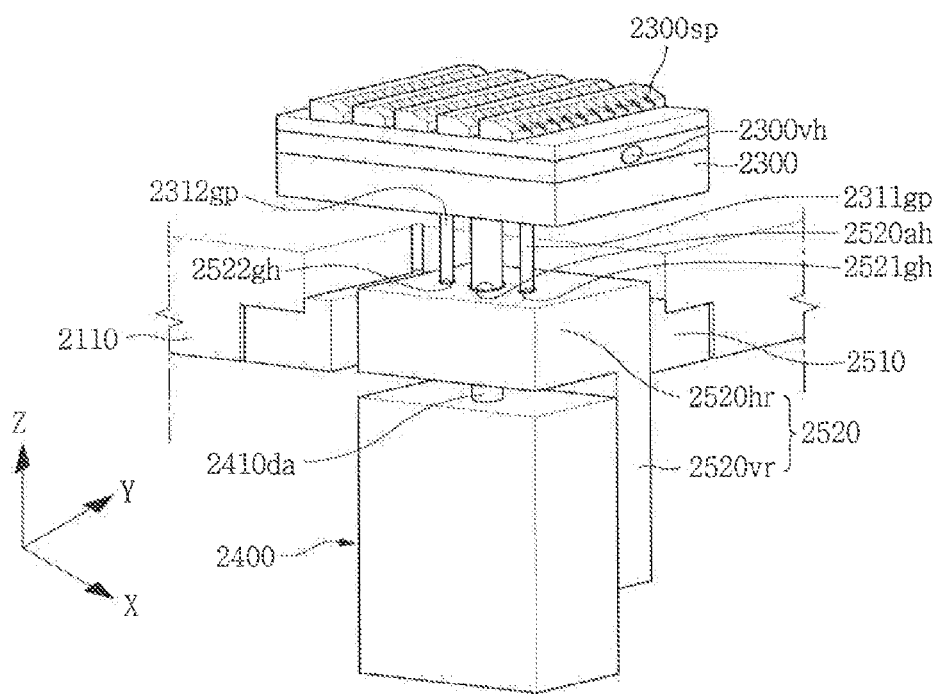
FIG. 6 is a perspective view illustrating a stacker lifting element of a scanning probe microscope in accordance with an exemplary embodiment of the present inventive concept.
Figure 7A:
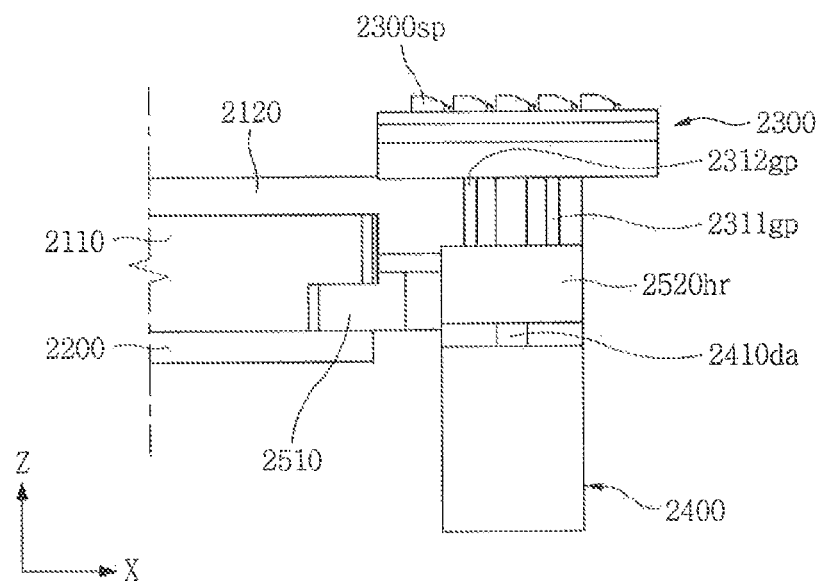
FIGS. 7A and 7B are side views illustrating stacker lifting elements of a scanning probe microscope, when a stacker is raised, in accordance with an exemplary embodiment of the present inventive concept.
Figure 7B:
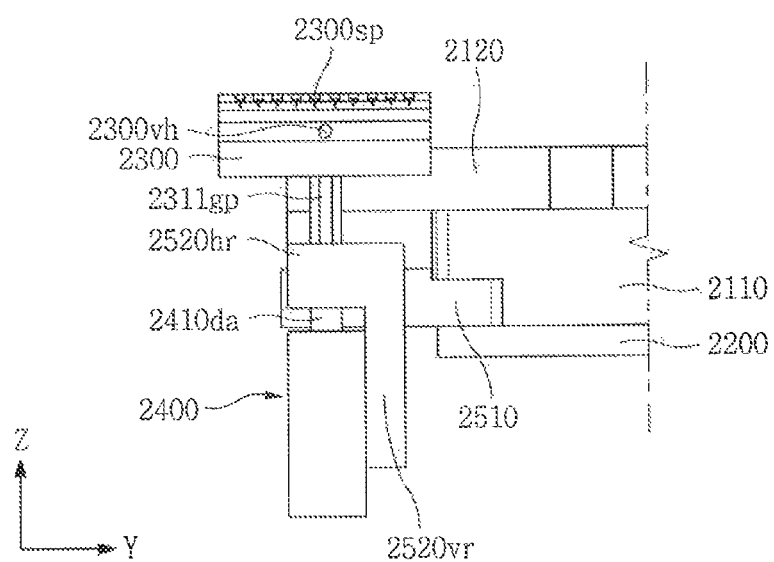
Figure 8A:
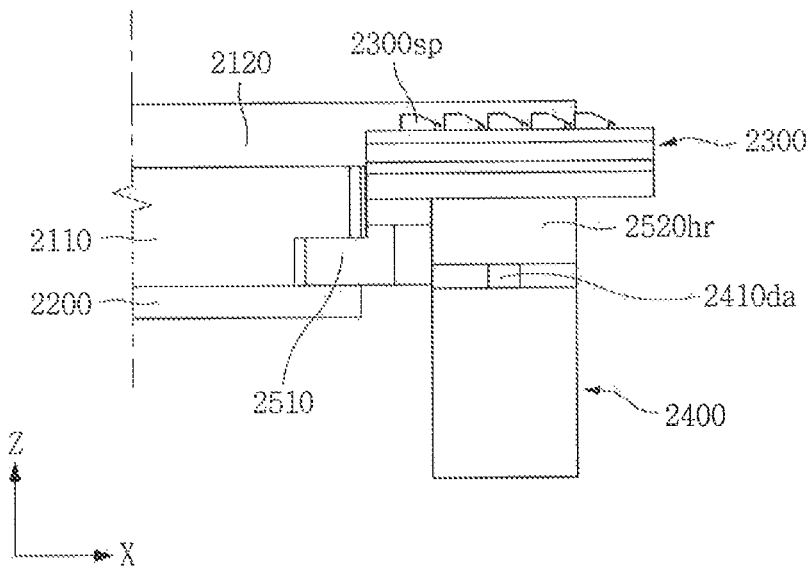
FIGS. 8A and 8B are side views illustrating stacker lifting elements of a scanning probe microscope, when a stacker is lowered, in accordance with an exemplary embodiment of the present inventive concept.
Figure 8B:
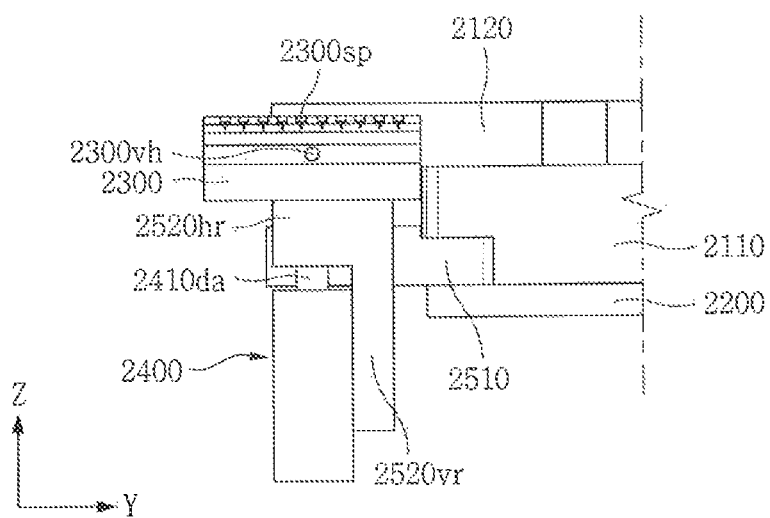

FIG. 6 is a perspective view illustrating a stacker lifting element of a scanning probe microscope in accordance with an exemplary embodiment of the present inventive concept. FIGS. 7A and 7B are side views illustrating stacker lifting elements of the scanning probe microscope, when the stacker is raised, in accordance with an exemplary embodiment of the present inventive concept. FIGS. 8A and 8B are side views illustrating stacker lifting elements of the scanning probe microscope, when the stacker is lowered, in accordance with an exemplary embodiment of the present inventive concept.

Referring to FIGS. 6, 7A, 7B, 8A and 8B, the scanning probe microscope according to exemplary embodiments of the present inventive concept may include the chuck body 2110, the stacker 2300, the stacker lifting element 2400, the first fixing block 2510, and the second fixing block 2520.

The stacker lifting element 2400 may include the lift driving axis 2410$da$ which may move in the up/down direction. The lift driving axis 2410$da$ may be in direct contact with the stacker 2300. The stacker 2300 may be supported by the lift driving axis 2410$da$. The bottom surface of the stacker 2300 may be coupled to the lift driving axis 2410$da$.

The first fixing block 2510 may be coupled to the chuck body 2100. The second fixing block 2520 may fix the stacker lifting element 2400 to the first fixing block 2510. The second fixing block 2520 may include a horizontal region 2520$hr$ and a vertical region 2520$vr$.

The vertical region 2520$vr$ of the second fixing block 2520 may be parallel to a side of the stacker lifting element 2400. For example, the vertical region 2520$vr$ of the second fixing block 2520 may face a side, which has a relatively wider horizontal distance of the stacker lifting element 2400. The vertical region 2520$vr$ of the second fixing block 2520 may be coupled to a side of the stacker lifting element 2400.

The horizontal region 2520$hr$ of the second fixing block 2520 may be disposed between the stacker 2300 and the stacker lifting element 2400. The horizontal region 2520$hr$ of the second fixing block 2520 may be extended between the stacker 2300 and the stacker lifting element 2400 from the top end of the vertical region 2520$vr$ of the second fixing element 2520. The horizontal region 2520$hr$ of the second fixing block 2520 may include a driving hole 2520$ah$, a first guide hole 2521$gh$, and a second guide hole 2522$gh$.

The driving hole 2520$ah$ may prevent vibration of the lift driving axis 2410$da$. The lift driving axis 2410$a$ may pass through the driving hole 2520$ah$. The lift driving axis 2410$da$ may move along the driving hole 2520$ah$ in the up/down direction.

The first guide hole 2521$gh$ and the second guide hole 2522$gh$ may prevent rotation of the stacker 2300. The first guide hole 2521$gh$ and the second guide hole 2522$gh$ may be spaced apart from the driving hole 2520$ah$. The second guide hole 2522$gh$ may be isolated from the first guide hole 2521$gh$.

For example, the driving hole 2520$ah$ may be disposed between the first guide hole 2521$gh$ and the second guide hole 2422$gh$.

The driving hole 2520$ah$, the first guide hole 2521$gh$ and the second guide hole 2522$gh$ may be disposed along a side of the stacker lifting element 2400. For example, the driving hole 2520$ah$, the first guide hole 2521$gh$ and the second guide hole 2522$gh$ may be disposed along a side of the stacker lifting element 2400 which is combined with the vertical region 2520$vr$ of the second fixing block 2520.

The stacker 2300 may include a first guide pin 2311$gp$ and a second guide pin 2312$gp$. The first guide pin 2311$gp$ and the second guide pin 2312$gp$ may be disposed on the bottom surface of the stacker 2300. The first guide pin 2311$gp$ may be inserted into the first guide hole 2521$gh$. The second guide pin 2312$gp$ may be inserted into the second guide hole 2522$gh$.

The second guide pin 2312$gp$ may be parallel to the first guide pin 2311$gp$. The first guide pin 2311$gp$ and the second guide pin 2312$gp$ may be parallel to the lift driving axis 2410$da$. Vertical dimensions of the first guide pin 2311$gp$ and the second guide pin 2312$gp$ may be smaller than a maximum vertical dimension of the lift driving axis 2410$da$. The vertical dimension of the second guide pin 2312$gp$ may be same as the vertical dimension of the first guide pin 2311$gp$.

The vertical dimension of the first guide pin 2311$gp$ and the vertical dimension of the second guide pin 2312$gp$ may be smaller than a vertical dimension of the horizontal region 2520$hr$ of the second fixing block 2520. A thickness of the horizontal region 2520$hr$ of the second fixing block 2520 may be larger than the vertical dimension of the first guide pins 2311$gp$ and the vertical dimension of the second guide pin 2312$gp$.

When the stacker 2300 is lowered by the stacker lifting element 2400, the stacker 2300 may be supported by the second fixing block 2520. When the stacker 2300 is lowered by the stacker lifting element 2400, the bottom surface of the stacker 2300 may be in direct contact with the top surface of the second fixing block 2520.

A level of the top surface of the first fixing block 2510 may be lower than a level of the top surface of the horizontal region 2520$hr$ of the second fixing block 2520. When the stacker 2300 is lowered by the stacker lifting element 2400, the top surface of the first fixing element 2510 may be spaced apart from the bottom surface of the stacker 2300.

When the stacker 2300 is raised by the stacker lifting element 2400, a vertical distance between the bottom surface of the stacker 2300 and the top surface of the horizontal region 2520$hr$ of the second fixing block 2520 may be smaller than the vertical dimension of the first guide pin 2311$gp$ and the vertical dimension of the second guide pin 2312$gp$.

In the scanning probe microscope according to exemplary embodiments of the present inventive concept, when the stacker 2300 is moved in the up/down direction Z by the stacker lifting element 2400, the first guide pin 2311$gp$ may move along the up/down direction Z within the first guide hole 2421$gh$ of the second fixing block 2520, and the second guide pin 2312$gp$ may move along the up/down direction within the second guide hole 2522$gh$ of the second fixing block 2520. In the scanning probe microscope according to exemplary embodiments of the present inventive concept, when the stacker 2300 is moved in the up/down direction Z, a rotation of the stacker 2300 may be prevented.

Figure 9:
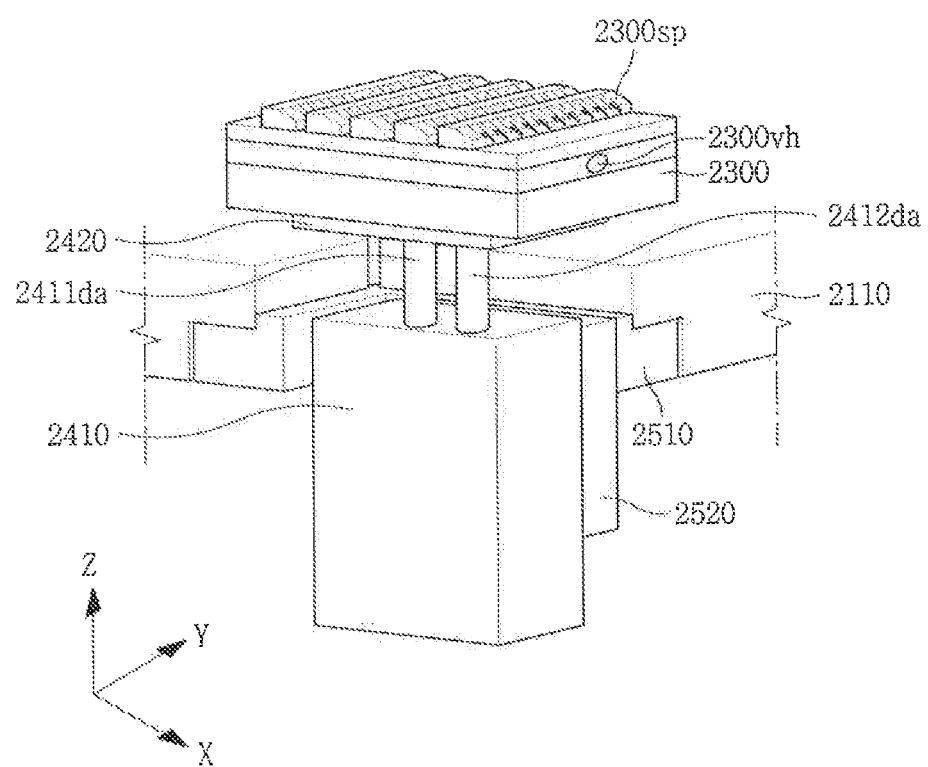
FIG. 9 is a perspective view illustrating a stacker lifting element of a scanning probe microscope in accordance with an exemplary embodiment of the present inventive concept.

FIG. 9 is a perspective view illustrating a stacker lifting element of a scanning probe microscope in accordance with an exemplary embodiment of the present inventive concept.

Referring to FIG. 9, the scanning probe microscope according to exemplary embodiments of the present inventive concept may include the chuck body 2110, the stacker 2300, the lifting body 2410, the lifting block 2420, the first fixing block 2510 and the second fixing block 2520.

The lifting body 2410 may include a first lift driving axis 2411*da* and a second lift driving axis 2412*da*. The first lift driving axis 2411*da* and the second lift driving axis 2412*da* may be coupled to the bottom surface of the lifting block 2420.

The second lift driving axis 2412*da* may be spaced apart from the first lift driving axis 2411*da*. For example, the first lift driving axis 2411*da* and the second lift driving axis 2412*da* may be disposed along a side, which has a relatively wide horizontal distance, of the lifting body 2410. The second lift driving axis 2412*da* may be parallel to the first lift driving axis 2411*da*.

In the scanning probe microscope according to exemplary embodiments of the present inventive concept, the lifting block 2420 may be moved in the up/down direction by the first driving axis 2411*da* and/or the second driving axis 2412*da*. In the scanning probe microscope according to exemplary embodiments of the present inventive concept, when the stacker 2300 positioned on the lifting block 2420 is moved in the up/down direction, the stacker 2300 can be prevented from rotating.

A level of the top surface of the lifting body 2410 may be higher than a level of the top surface of the second fixing block 2520. A level of the top surface of the second fixing block 2520 may be a same level as a level of the top surface of the first fixing block 2510.

In the scanning probe microscope according to exemplary embodiments of the present inventive concept, a level of the top surface of the lifting body 2410 may be higher than a level of the top surfaces of the first fixing block 2510 and the second fixing block 2520. In the scanning probe microscope according to exemplary embodiments of the present inventive concept, the lifting block 2420 may be prevented from bumping against the first fixing block 2510 or the second fixing block 2520. In the scanning probe microscope according to exemplary embodiments of the present inventive concept, the stacker 2300 may move freely.

Figure 10A:
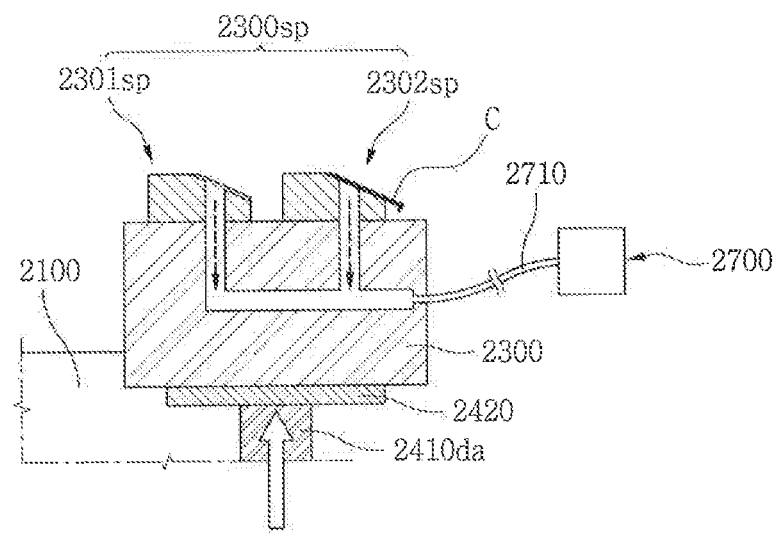
FIGS. 10A to 10L are schematic views sequentially illustrating a method of operating a scanning probe microscope, when replacing a cantilever with another cantilever, in accordance with an exemplary embodiment of the present inventive concept.

FIGS. 10A to 10L are schematic views sequentially illustrating a method of operating a scanning probe microscope, when replacing a cantilever with another cantilever, in accordance with exemplary embodiments of the present inventive concept. FIG. 11 is a flowchart showing a method of operating a scanning probe microscope, when replacing the cantilever with another cantilever, in accordance with exemplary embodiments of the present inventive concept.

With reference to FIGS. 10A to 10L, and FIG. 11 a method of operating the scanning probe microscope, when replacing the cantilever, will be described according to exemplary embodiments of the present inventive concept. Referring first to FIG. 10A, the method of replacing the cantilever in accordance with exemplary embodiments of the present inventive concept may include a step S100 of elevating the stacker 2300.

The step S100 of elevating the stacker 2300 may include a step of raising the lifting block 2420 by driving the lift driving axis 2410*da*. The step of raising the lifting block 2420 may include a step of moving the cantilever loading spots 2300*sp* of the stacker 2300 to be positioned higher than the top surface of the chuck 2100 by the lift driving axis 2410*da*. When the stacker 2300 is raised by the lift driving axis 2410*da*, the maximum level of the top surface of the stacker 2300 may be higher than a level of the top surface of the chuck 2100. The cantilever loading spots 2300*sp* may include a first loading spot 2301*sp* not containing the cantilever C, and a second loading spot 2302*sp* containing the cantilever C.

In the method of operating the scanning probe microscope according to exemplary embodiments of the present inventive concept, when the cantilever C fixed to the head module 3000 is replaced, the cantilever loading spots 2300*sp* of the stacker 2300 may be moved to be positioned higher than the chuck 2100. In the method of operating the scanning probe microscope according to exemplary embodiments of the present inventive concept, the head module 3000 may be prevented from coming into contact with the chuck 2100.

The step S100 of elevating the stacker 2300 may be carried out while the stacker vacuum pump 2700 is operating. The step S100 of elevating the stacker 2300 may include a step of raising the lifting block 2420 while the cantilevers C is attached to the cantilever loading spots 2300*sp* by vacuum.

The method of operating the scanning probe microscope according to exemplary embodiments of the present inventive concept may include a step S200 of loading the cantilever C, which has been fixed to the head module 3000, to the first loading spot 2301*sp* of the stacker 2300.

The step S200 of loading the cantilever C of the head module 3000 to the first loading spot 2301*sp* may include a step S210 of moving the head module 3000 to the first loading spot 2301*sp* not including the cantilever C, a step S220 of dropping the head module 3000, a step S230 of stopping the head vacuum pump 3300, and a step S240 of elevating the head module 3000.

Figure 10B:
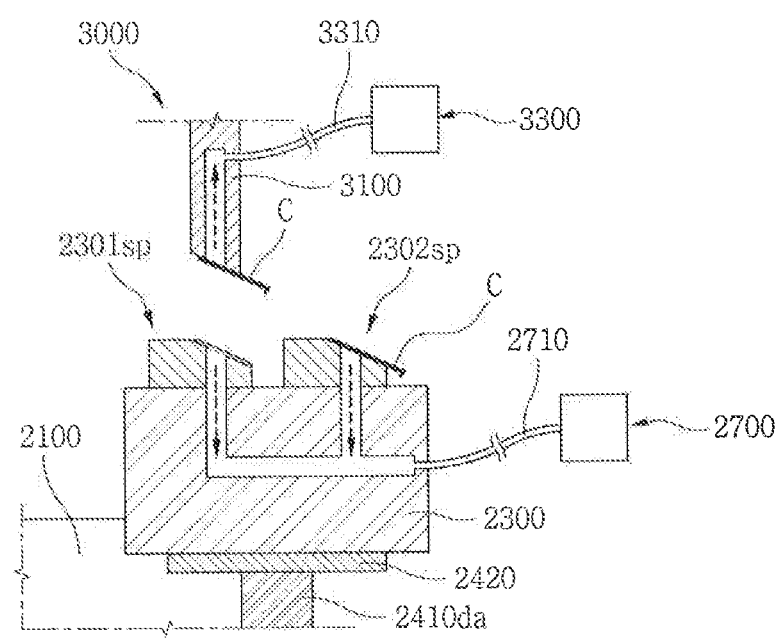
Figure 11:
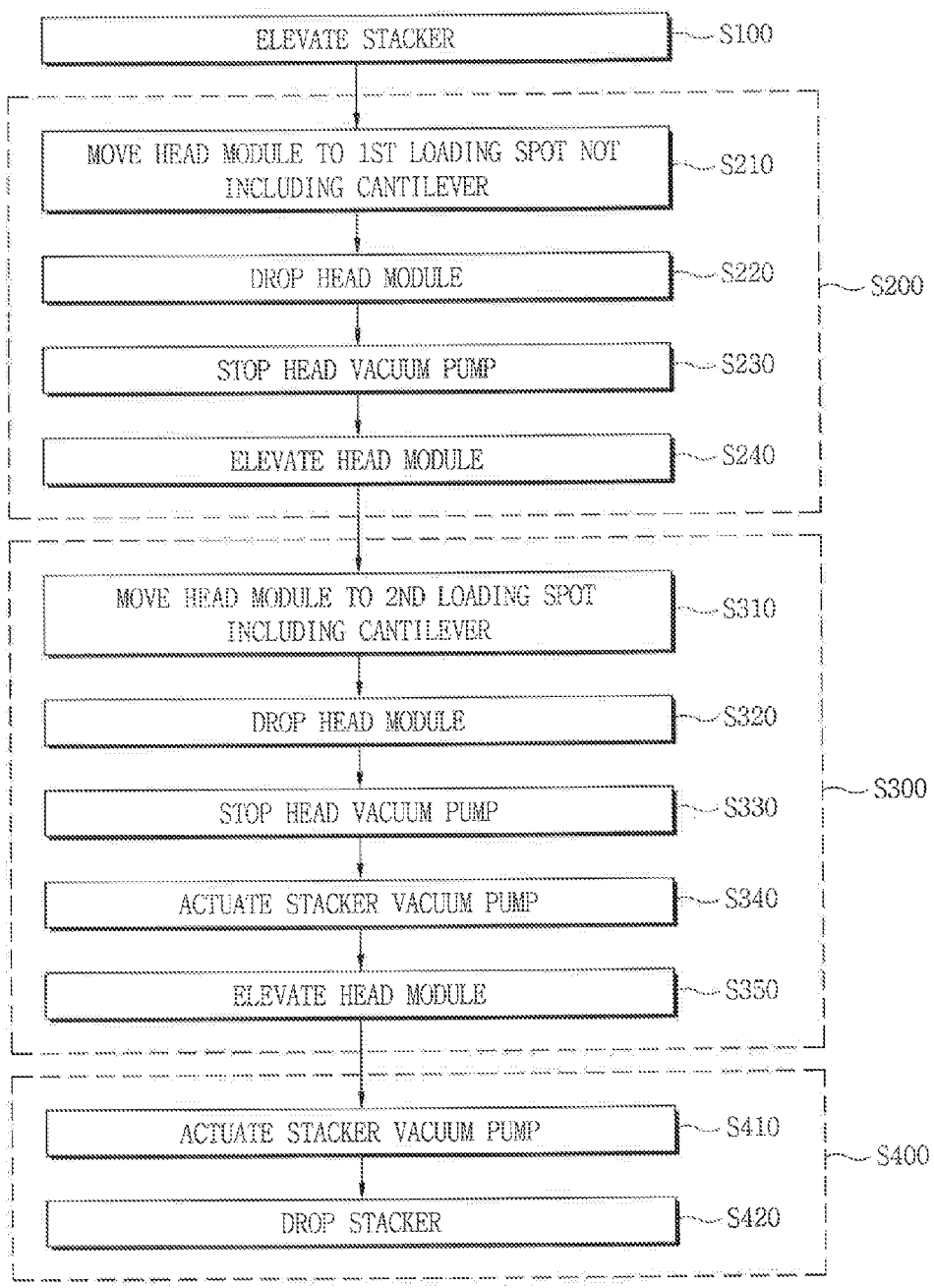
FIG. 11 is a flowchart showing a method of operating a scanning probe microscope, when replacing a cantilever with another cantilever, in accordance with an exemplary embodiment of the present inventive concept.

Referring to FIG. 10B, the step S210 of moving the head module 3000 to the first loading spot 2301*sp* may include a step of transferring the head module 3000 to place the cantilever C, which has been fixed to the cantilever fixing element 3100 of the head module 3000, on the top surface of the first loading spot 2301*sp*.

The step S210 of moving the head module 3000 to the first loading spot 2301*sp* may be carried out while the head vacuum pump 3300 of the head module 3000 is operating. The step S210 of moving the head module 3000 to the first loading spot 2301*sp* may include a step of transferring the head module 3000 to the first loading spot 2301*sp* while the cantilever C is attached to the cantilever holding element 3100 by a vacuum.

Figure 10C:
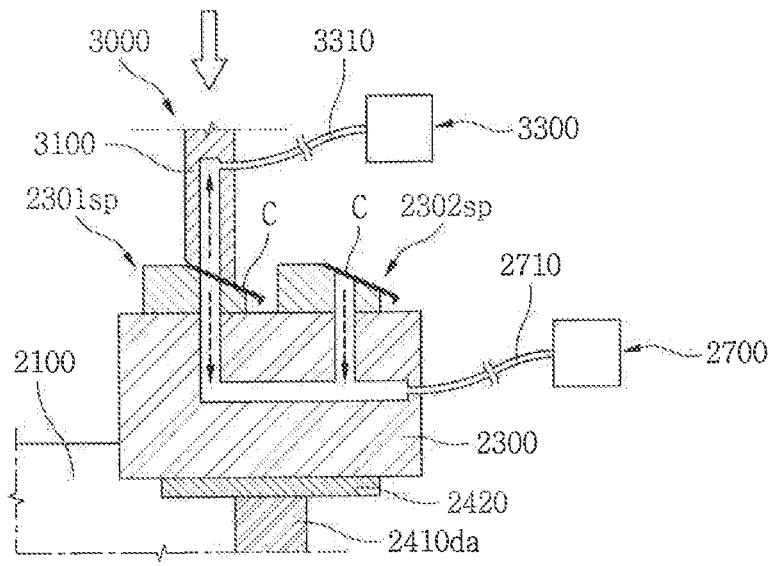

Referring to FIG. 10C, the step S220 of dropping the head module 3000 may include a step of loading the cantilever C, which has been fixed to the cantilever fixing element 3100, onto the first loading spot 2301*sp*.

Figure 10D:
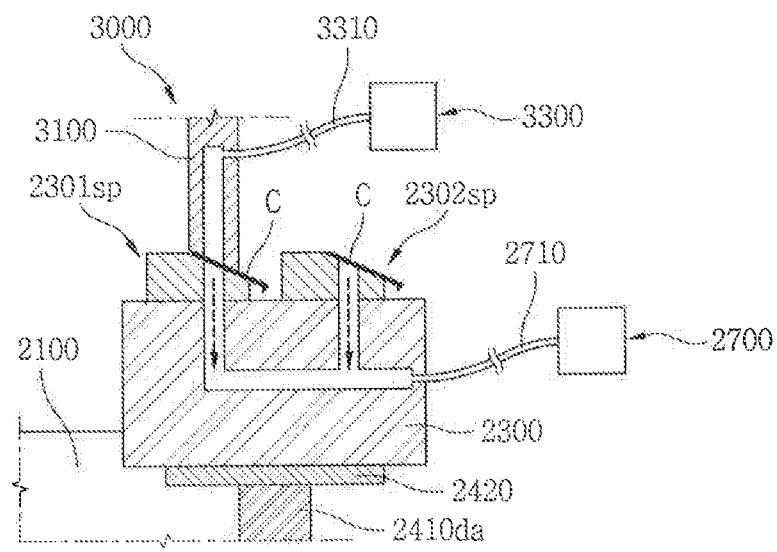

Referring to FIG. 10D, the step S230 of stopping the head vacuum pump 3300 may include a step of attaching the cantilever C, which is mounted on the first loading spot 2301*sp*, to the first loading spot 2301*sp* by the stacker vacuum pump 2700.

Figure 10E:
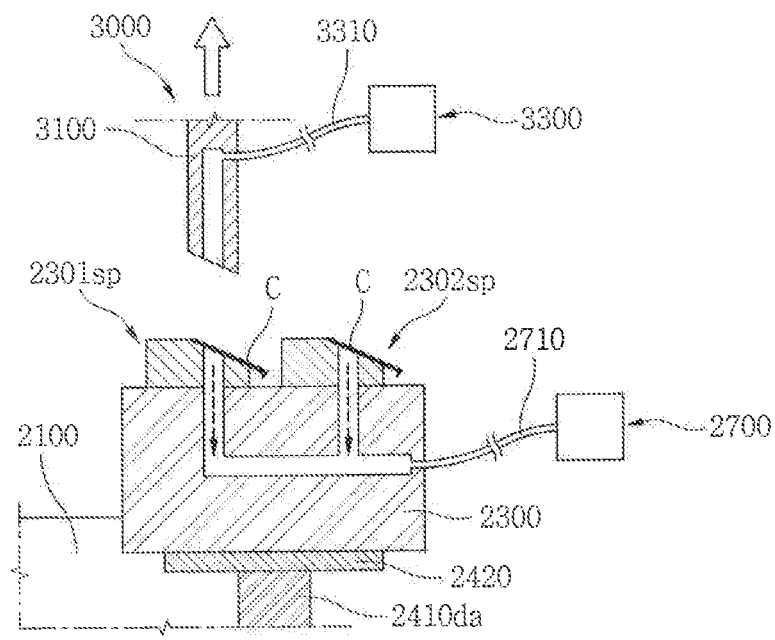

Referring to FIG. 10E, the step S240 of elevating the head module 3000 may include a step of raising the cantilever fixing element 3100 while the cantilever C is mounted on the first loading spot 2301*sp*. The step S240 of elevating the head module 3000 may be carried out while the head vacuum pump 3300 is stopped.

The method of operating the scanning probe microscope according to exemplary embodiments of the present inventive concept may include a step S300 of fixing one of the cantilevers C, which are loaded on the stacker 2300, to the head module 3000.

The step S300 of fixing one of the cantilevers C loaded on the stacker 2300 may include a step S310 of transferring the head module 3000 onto the second loading spot 2302*sp* containing the cantilever C, a step S320 of dropping the head module 3000, a step S330 of stopping the stacker vacuum pump 2700, a step S340 of actuating the head vacuum pump 3300, and a step S350 of raising the head module 3000.

Figure 10F:
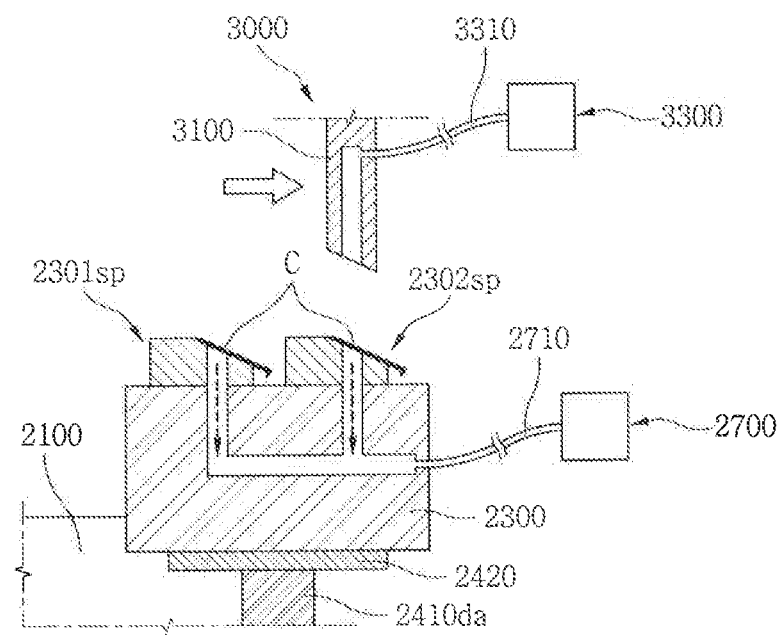

Referring to FIG. 10F, the step S310 of transferring the head module 3000 to the second loading spot 2302sp may include a step of transferring the head module 3000 to place the cantilever fixing element 3100 on the top surface of the second loading spot 2302sp. The step S310 of transferring the head module 3000 onto the second loading spot 2302sp may include a step of moving the head module 3000 to place the cantilever fixing element 3100 on the cantilever C which is mounted on the second loading spot 2302sp.

Figure 10G:
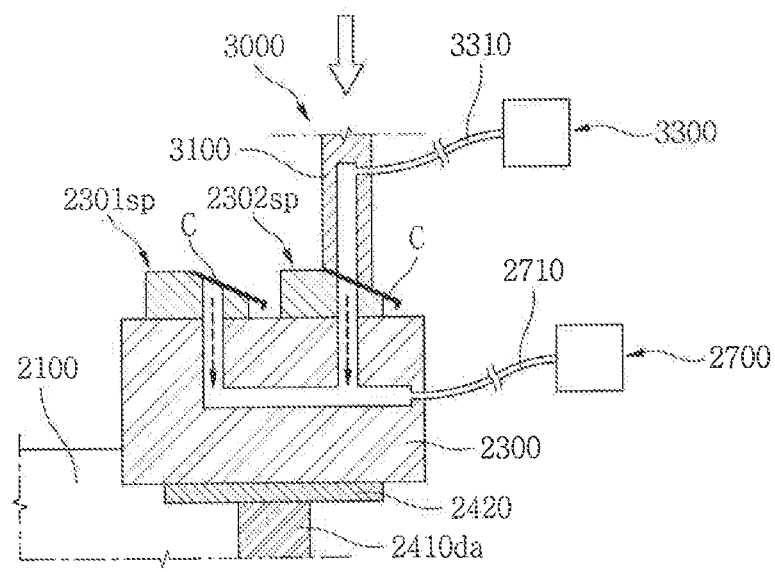

Referring to FIG. 10G the step S320 of dropping the head module 3000 may include a step of dropping the head module 3000 to contact the cantilever fixing element 3100 with the cantilever C which is mounted on the second loading spot 2302sp.

Figure 10H:
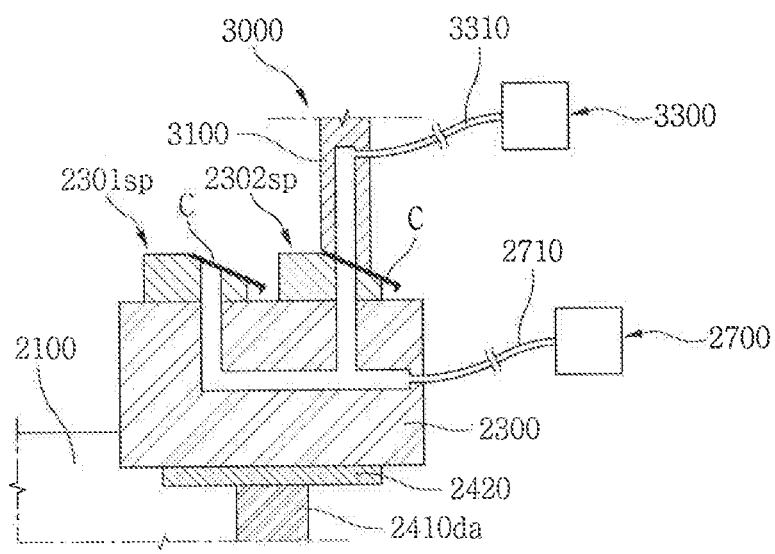

Referring to FIG. 10H, the step S330 of stopping the stacker vacuum pump 2700 may include a step of stopping the cantilevers C, which are contained on the first and second loading spots 2301sp and 2302sp, from being attached thereto by vacuum. The step S330 of stopping the stacker vacuum pump 2700 may include a step of removing the vacuum for fixing the cantilevers C which are mounted on the first loading spot 2301sp and the second loading spot 2302sp.

Figure 10I:
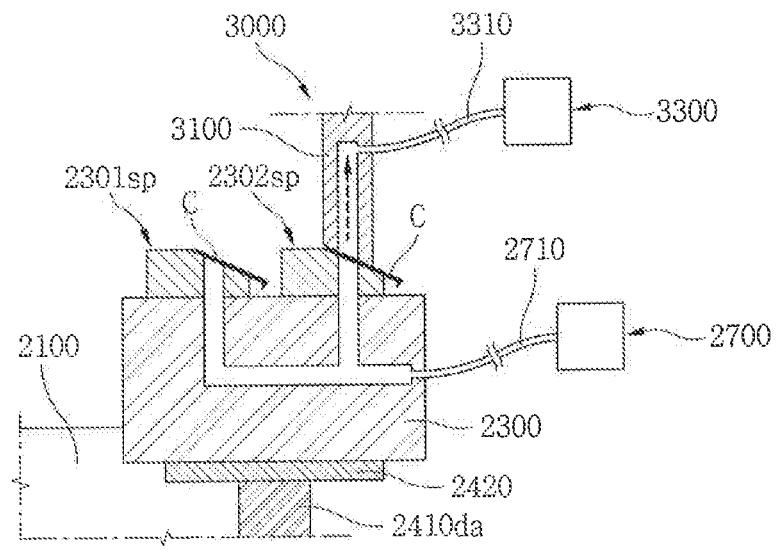

Referring to FIG. 10I, the step S340 of actuating the head vacuum pump 3300 may include a step of attaching the cantilever C, which is mounted on the second loading spot 2302sp, to the cantilever fixing element 3100 by vacuum.

According to the method of operating the scanning probe microscope according to exemplary embodiments of the present inventive concept, the head vacuum pump 3000 may be actuated after stopping the stacker vacuum pump 2700. The stacker vacuum pump 2700 may be stopped after actuating the head vacuum pump 3300. The step of actuating the head vacuum pump 3300 and the step of stopping the stacker vacuum pump 2700 may be performed simultaneously.

Figure 10J:
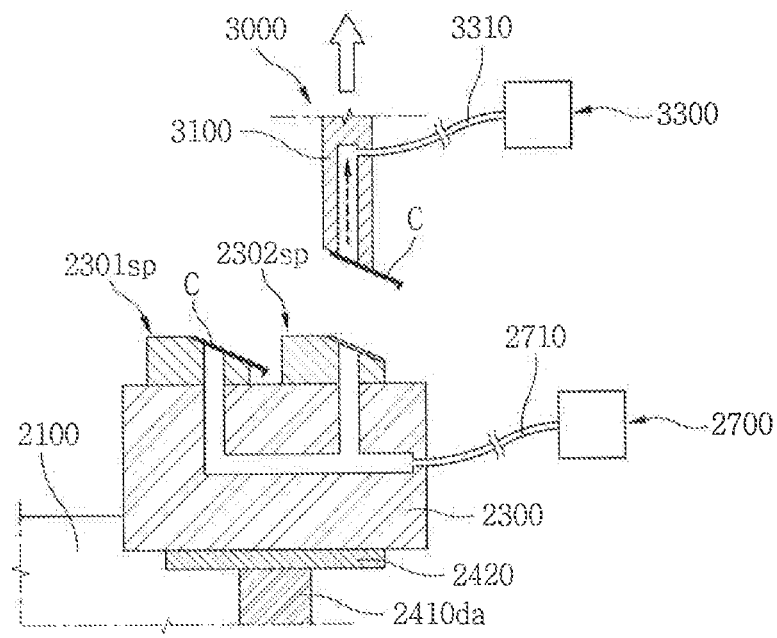

Referring to FIG. 10J, the step S350 of elevating the head module 3000 may include a step of raising the cantilever fixing element 3100 from the second loading spot 2302sp. The step S350 of elevating the head module 3000 may be carried out while the head vacuum pump 3300 is running. The step S350 of elevating the head module 3000 may include a step of raising the cantilever C which was mounted on the second loading spot 2302sp.

The method of operating the scanning probe microscope according to exemplary embodiments of the present inventive concept may include a step S400 of preparing the scanning probe microscope for measuring the surface profile of the object W.

The step S400 of preparing the scanning probe microscope may include a step S410 of actuating the stacker vacuum pump 2700 and a step of dropping the stacker 2300.

Figure 10K:
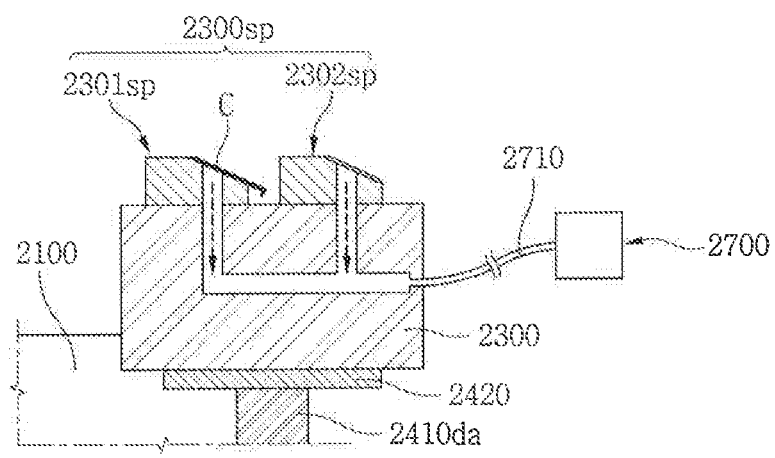

Referring to FIG. 10K, the step S410 of actuating the stacker vacuum pump 2700 may include a step of attaching the cantilevers C, which are contained in the stacker 2300, to their corresponding loading spots 2300sp. For example, mounting cantilever C to loading spot 2301sp. The step S410 of actuating the stacker vacuum pump 2700 may include a step of fixing the cantilevers C, which are mounted on the loading spots 2300sp of the stacker 2300.

Figure 10L:
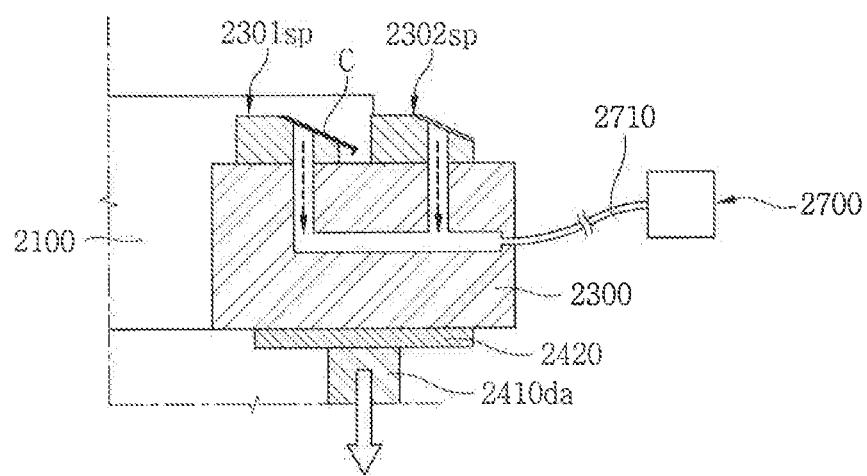

Referring to FIG. 10L, the step S420 of dropping the stacker 2300 may include a step of dropping the lifting block 2420 by driving the lift driving axis 2410da. The step of dropping the lifting block 2420 may include a step of transferring the cantilever loading spots 2300sp of the stacker 2300, by the lift driving axis 2410da, to be positioned lower than the top face of the chuck 2100. When the stacker 2300 is lowered by the lift driving axis 2410da, the maximum level of the top surface of the stacker 2300 may be lower than the level of the top surface of the chuck 2100.

In the method of operating the scanning probe microscope according to exemplary embodiments of the present inventive concept, when the stacker 2300 is lowered, the head module 3000 may measure the surface profile of the object W. In the scanning probe microscope according to exemplary embodiments of the present inventive concept, while the surface profile of the object W is being measured, the head module 3000 can be prevented from contacting the stacker 2300.

The step S420 of dropping the stacker 2300 may be carried out while the stacker vacuum pump 2700 is running. The step S420 of dropping the stacker 2300 may include a step of dropping the lifting block 2420 while the cantilevers C are fixed to their corresponding cantilever loading spots 2300sp.

In the scanning probe microscope according to exemplary embodiments of the present inventive concept, a cantilever C, which is fixed to the head module, may be replaced with one or more of the cantilevers C loaded on the stacker without elevation of the chuck 2100. When replacing a cantilever C fixed to the head module 3000 in the scanning probe microscope, the head module 3000 may be prevented from contacting the chuck 2100.

While the inventive concept has been particularly shown and described with reference to exemplary embodiments thereof, it will be understood by those of ordinary skill in the art that various changes in form and detail may be made therein without departing from the spirit and scope of the inventive concept.

What is claimed is:

1. A scanning probe microscope, comprising:
a chuck configured to fix an object;
a stacker configured to load one or more cantilevers onto a head module; and
a stacker lifting element configured to move the stacker in an up and down direction; wherein the stacker lifting element includes a lifting block configured to support the stacker, and a lifting body disposed under the lifting block, wherein the lifting body includes a first lift driving axis configured to move the lifting block in the up and down direction.

2. The scanning probe microscope according to claim 1, wherein the lifting body further includes a second lift driving axis configured to move the lifting block in the up and down direction, wherein the second lift driving axis is parallel to the first lift driving axis.

3. The scanning probe microscope according to claim 1, wherein the lifting block includes a guide region extending along a first side of the lifting body.

4. The scanning probe microscope according to claim 3, wherein a vertical dimension of the guide region of the lifting block is larger than a vertical dimension of the first lift driving axis of the lifting body.

5. The scanning probe microscope according to claim 3, wherein the stacker lifting element further includes a linear moving block configured to move along the first side of the lifting body in the up and down direction, the linear moving block being coupled to the guide region of the lifting block.

6. The scanning probe microscope according to claim 3, wherein the chuck further includes a chuck holding part configured to support the object, a chuck body disposed under the chuck holding part, and a lift fixing block configured to fix the lifting body to the chuck body.

7. A The scanning probe microscope according to claim 6, wherein the lift fixing block is disposed opposite to a second side of the lifting body, and a horizontal dimension of the second side of the lifting body is larger than a horizontal dimension of the first side of the lifting body.

8. The scanning probe microscope according to claim 1, wherein when the stacker is lowered by the stacker lifting element, a level of a top surface of the stacker is lower than a level of a top surface of the chuck, and wherein when the stacker is raised by the stacker lifting element, and the level of the top surface of the stacker is higher than the level of the top surface of the chuck.

9. A scanning probe microscope, comprising:
   a chuck holding part configured to support an object;
   a chuck body disposed under the chuck holding part;
   a chuck driving element disposed under the chuck body;
   a stacker configured to load one or more cantilevers, the stacker horizontally spaced apart from the chuck holding part;
   a stacker lifting element disposed under the stacker, the stacker lifting element including a lift driving axis configured to move the stacker in an up and down direction; and
   a lift fixing block configured to couple the stacker lifting element to the chuck body.

10. The scanning probe microscope according to claim 9, wherein the lift fixing block includes a horizontal region extending between the stacker and the stacker lifting element, the horizontal region including a driving hole configured to pass through the lift driving axis and a first guide hole spaced apart from the driving hole.

11. The scanning probe microscope according to claim 10, wherein the stacker is coupled to the lift driving axis, and the stacker includes a first guide pin disposed in the first guide hole.

12. The scanning probe microscope according to claim 11, wherein when the stacker is raised by the stacker lifting element, a vertical dimension between the bottom surface of the stacker and the top surface of the horizontal region is shorter than a vertical dimension of the first guide pin.

13. The scanning probe microscope according to claim 11, wherein a vertical dimension of the first guide pin is shorter than a vertical dimension of the horizontal region.

14. The scanning probe microscope according to claim 13, wherein the horizontal region of the lift fixing block includes a second guide hole spaced apart from the first guide hole, and the stacker includes a second guide pin disposed in the second guide hole, wherein the driving hole is disposed between the first guide hole and the second guide hole.

15. A scanning probe microscope, comprising:
   a head module, wherein the head module includes a cantilever fixing element configured to hold a cantilever, and a head vacuum pump coupled to the cantilever fixing element, the head vacuum pump configured to fix the cantilever to the cantilever fixing element;
   a stacker, wherein the stacker includes a first loading spot configured to support a first cantilever and a second loading spot configured to support a second cantilever, and a stacker vacuum pump coupled to the stacker, the stacker vacuum pump configured to fix the first cantilever to the first loading spot and the second cantilever to the second loading spot; and
   a lifting body, wherein the lifting body includes a lift driving axis, the lift driving axis configured to raise and lower the stacker.

16. The scanning probe microscope of claim 15, further comprising a lifting block configured to prevent the stacker from rotating,
   wherein the stacker is disposed on the lifting block, and the lifting block is coupled to a lift driving axis.

17. The scanning probe microscope of claim 15, further comprising a chuck configured to hold an object,
   wherein the lifting body is coupled to the chuck, and the lifting body is configured to raise the first and second loading spots to a higher position than a height of a top surface of the chuck.

18. The scanning probe microscope of claim 15, wherein the stacker pump is configured to fix the first and the second cantilever, simultaneously.

19. The scanning probe microscope of claim 15, wherein the head module further comprises a light source element and a light detection element.

* * * * *